(12) United States Patent
Hughes et al.

(10) Patent No.: US 8,846,582 B2
(45) Date of Patent: Sep. 30, 2014

(54) SOLVENT ASSISTED OIL RECOVERY

(75) Inventors: Trevor Hughes, Cambridge (GB); Gary Tustin, Sawston (GB); Alexander Wilson, Hardwick (GB); Carlos Abad, Richmond, TX (US)

(73) Assignee: Schlumberger Technology Corporation, Sugar Land, TX (US)

( * ) Notice: Subject to any disclaimer, the term of this patent is extended or adjusted under 35 U.S.C. 154(b) by 1010 days.

(21) Appl. No.: 12/988,867

(22) PCT Filed: Apr. 23, 2009

(86) PCT No.: PCT/GB2009/001059
§ 371 (c)(1),
(2), (4) Date: Feb. 16, 2011

(87) PCT Pub. No.: WO2009/130482
PCT Pub. Date: Oct. 29, 2009

(65) Prior Publication Data
US 2011/0152136 A1 Jun. 23, 2011

(30) Foreign Application Priority Data
Apr. 23, 2008 (GB) .................................. 0807386.8

(51) Int. Cl.
C09K 8/524 (2006.01)
C09K 8/64 (2006.01)
C09K 8/594 (2006.01)

(52) U.S. Cl.
CPC ..................................... C09K 8/594 (2013.01); C09K 8/524 (2013.01)
USPC .......................................... 507/126; 507/133

(58) Field of Classification Search
None
See application file for complete search history.

(56) References Cited

U.S. PATENT DOCUMENTS

| | | | |
|---|---|---|---|
| 3,358,757 A * | 12/1967 | Holmes ....................... | 166/270.1 |
| 3,954,141 A | 5/1976 | Allen et al. | |
| 4,004,636 A | 1/1977 | Brown et al. | |
| 4,007,785 A | 2/1977 | Allen et al. | |
| 4,008,764 A | 2/1977 | Allen | |
| 4,026,358 A | 5/1977 | Allen | |
| 4,071,458 A | 1/1978 | Allen | |
| 4,101,425 A | 7/1978 | Young et al. | |
| 4,109,720 A | 8/1978 | Allen et al. | |
| 4,271,905 A | 6/1981 | Redford et al. | |
| 4,337,828 A | 7/1982 | Blair, Jr. | |
| 4,379,489 A | 4/1983 | Rollmann | |
| 4,487,264 A | 12/1984 | Hyne et al. | |
| 4,498,537 A | 2/1985 | Cook | |
| 4,565,249 A | 1/1986 | Pebdani et al. | |
| 4,609,043 A | 9/1986 | Cullick | |
| 4,614,236 A | 9/1986 | Watkins et al. | |
| 4,628,999 A | 12/1986 | Kiss et al. | |
| 4,687,058 A | 8/1987 | Casad et al. | |
| 4,706,750 A | 11/1987 | Buckles | |
| 4,756,369 A | 7/1988 | Jennings, Jr. et al. | |
| 4,800,957 A | 1/1989 | Stevens, Jr. et al. | |
| 4,821,801 A | 4/1989 | Van Laar | |
| 4,852,651 A | 8/1989 | Davis | |
| 4,887,671 A | 12/1989 | Stevens, Jr. | |
| 4,913,235 A | 4/1990 | Harris et al. | |
| 4,945,989 A | 8/1990 | Irani et al. | |
| 4,945,990 A | 8/1990 | Irani et al. | |
| 4,989,674 A | 2/1991 | Davis | |
| 5,022,467 A | 6/1991 | Irani et al. | |
| 5,056,596 A | 10/1991 | McKay et al. | |
| 5,080,169 A | 1/1992 | Davis | |
| 5,117,907 A | 6/1992 | Hsu | |
| 5,123,486 A | 6/1992 | Davis | |
| 5,139,088 A | 8/1992 | De Boer et al. | |
| 5,232,049 A | 8/1993 | Christiansen et al. | |
| 5,388,644 A * | 2/1995 | Romocki ....................... | 166/268 |
| 5,400,430 A | 3/1995 | Nenniger | |
| 5,438,039 A | 8/1995 | Del Bianco et al. | |
| 5,690,176 A | 11/1997 | Delbianco et al. | |
| 5,711,373 A | 1/1998 | Lange | |
| 5,871,053 A | 2/1999 | Stern | |
| 6,051,535 A | 4/2000 | Bilden et al. | |
| 6,467,340 B1 | 10/2002 | Gallagher et al. | |
| 6,534,449 B1 | 3/2003 | Gilmour et al. | |
| 6,564,869 B2 | 5/2003 | McKenzie et al. | |
| 6,630,428 B1 | 10/2003 | Furman et al. | |

(Continued)

FOREIGN PATENT DOCUMENTS

| | | |
|---|---|---|
| WO | 0120322 A1 | 3/2001 |
| WO | 0155281 | 8/2001 |

(Continued)

OTHER PUBLICATIONS

Zhong et al: "Solubility of stearic acid in supercritical CO2 with cosolvents", 1997. J. Supercritical Fluids, v10, 113-118.
Thomas et al: "Limonene"; Natural product reports 1989, pp. 291-309.
Vargas et al: "Development of a general method for Modeling Asphaltene Stability"; Energy and Fuels 23 pp. 1147-1154 (2009).
Search Report for PCT/GB2009/001059 dated Aug. 14, 2009.
Search Report for GB0807386.8 dated Jun. 16, 2008.
Rassamdana et al "Asphalt Flocculation and Deposition: 1. the Onset of precipitation" AIChE Journal vol. 42 pp. 10-22 Jan. 1996.

(Continued)

Primary Examiner — Susannah Chung
Assistant Examiner — Kumar R Bhushan

(57) ABSTRACT

The recovery of oil from a reservoir is assisted by injecting a diluent into the reservoir formation to reduce the viscosity of the crude oil. This diluent is a mixture of a material which is an asphaltene precipitant, especially supercritical carbon dioxide, and a more polar material which comprises at least one aliphatic compound which includes at least one of a cycloaliphatic ring, an olefinic unsaturation, an ester or ether group. The inclusion of such an aliphatic compound which is more polar than the asphaltene precipitant reduces asphaltene precipitation and can enhance the efficiency of oil recovery when the precipitant is by supercritical carbon dioxide.

15 Claims, 4 Drawing Sheets

(56) References Cited

U.S. PATENT DOCUMENTS

| | | | |
|---|---|---|---|
| 6,662,872 | B2 | 12/2003 | Gutek et al. |
| 7,198,103 | B2 | 4/2007 | Campbell |
| 7,231,976 | B2 | 6/2007 | Berry et al. |
| 7,500,522 | B2 | 3/2009 | Skibinski et al. |
| 2003/0024703 | A1 | 2/2003 | McKenzie et al. |
| 2003/0167157 | A1 | 9/2003 | Mougin et al. |
| 2003/0213747 | A1 | 11/2003 | Carbonell et al. |
| 2005/0211434 | A1 | 9/2005 | Gates et al. |
| 2006/0035793 | A1* | 2/2006 | Goldman ............... 508/433 |
| 2006/0096757 | A1 | 5/2006 | Berry et al. |
| 2006/0136175 | A1 | 6/2006 | Suzuki et al. |
| 2007/0007004 | A1 | 1/2007 | Castellano |
| 2007/0062698 | A1* | 3/2007 | Smith et al. ............. 166/279 |
| 2007/0095534 | A1 | 5/2007 | Hughes |
| 2007/0095753 | A1 | 5/2007 | Carbonell |
| 2007/0124950 | A1 | 6/2007 | Wirtz |
| 2007/0151729 | A1 | 7/2007 | Hoch |
| 2007/0169934 | A1 | 7/2007 | Campbell |
| 2007/0295640 | A1 | 12/2007 | Tan et al. |
| 2008/0139418 | A1 | 6/2008 | Cioletti |

FOREIGN PATENT DOCUMENTS

| | | |
|---|---|---|
| WO | 0155281 A1 | 8/2001 |
| WO | 2006047745 A1 | 5/2006 |
| WO | 2007005944 A2 | 1/2007 |

OTHER PUBLICATIONS

Akbardazeh et al: "Methodology for the Characterization and Modeling of Asphaltene Precipitation from Heavy Oils Diluted with n-Alkanes"; Energy & Fuels 18, 1434-1441 (2004).
Alboudwarej et al: "Regular Solution Model for Asphaltene Precipitation from Bitumens and Solvents"; AIChE Journal 49, 2948-2956 (2003).
Allada, S R: "Solubility Parameters of Supercritical Fluids"; Ind_Eng_ChemProcess Des_Dev_23_344-348 (1984).
Anderson, S I: "Flocculation Onset Titration of Petroleum Asphaltenes"; Energy & Fuels 13, 315-322 (1999).
Angle et al: "Precipitation of asphaltenes from solvent-diluted heavy oil and thermodynamic properties of solvent-diluted heavy oil solutions"; Fuel vol. 85 pp. 492-506 (2006).
Benvenuti et al: "High pressure equilibrium data in systems containing supercritical carbon dioxide, limonene and citral"; J. Chem. Eng. Data, vol. 46, pp. 795-799 (2001).
Berna et al: "Solubilities of Essential Oil Components of Orange in Supercritical Carbon Dioxide"; J. Chem. Eng. Data, 45 (5), 724-727 (2000).
Bon et al: "A Technical Evaluation of a CO2 Flood for EOR Benefits in the Cooper Basin, South Australia"; SPE Paper 88451 (2004).
Broad et al: "Deposition of Asphaltenes during CO2 Injection and Implications for EOS Description and Reservoir Performance"; IPTC paper 11563 (2007).
Buckley et al: "Solubility of the Least-Soluble Asphaltenes" Chapter 10 of "Asphaltenes, Heavy oils and Petroleomics" edited by Oliver C Mullins, Eric Y. Sheu, Ahmed Hammami and Alan G Marshall, Springer Science&business media LLC, 2007 pp. 401-437.
Buckley et al: "Asphaltene Precipitation and Solvent Properties of Crude Oils"; Petroleum Science and Technology vol. 16, No. 3-4, pp. 251-285 (1998).
Butler et al: "A new process (VAPEX) for recovering heavy oils using hot water and hydrocarbon vapour"; JCPT, v30, No. 1, 97-106 Jan.-Feb. 1991; Petsoc paper 91-01-09-P.
Butler et al: "Recovery of heavy oils using vapourised hydrocarbon solvents: further developments of the VAPEX process"; JCPT, v32, No. 6, pp. 56-62, Jun. 1993; Petsoc paper 93-06-06-P.
Consan et al: "Observations on the solubility of surfactants and related molecules in carbon dioxide at 50° C.", J. Supercritical Fluids, v3, 51-65 (1990).
Dandge et al: "Structure Solubility Correlations: Organic Compounds and Dense Carbon Dioxide Binary Systems"; Ind. Eng, Chem. Prod. Res. Dev. vol. 24, pp. 162-166 (1985).

Das et al: "Effect of asphaltene deposition on the VAPEX process: A preliminary investigation using a Hele-Shaw cell", JCPT, v33, No. 6, pp. 39-45, Jun. 1994; Petsoc paper 94-06-06-P.
Fan et al: "Evaluating Crude Oils by SARA Analysis" SPE Paper 75228 (2002).
Fisher, C H: "Solubility Parameters of Oil and Fat Chemicals"; J. American Oil Chemists Society vol. 78(2)_p. 215_(2001).
Frost et al: "New, Highly Effective Asphaltene Removal System With Favorable HSE Characteristics"; SPE paper 11420 (2008).
Gonzalez et al: "Asphaltenes Precipitation from Crude Oil and Hydrocarbon Media"; Energy & Fuels vol. 20 pp. 2544-2551 (2006).
Guo et al: "Offshore Pipelines" Gulf Professional Publishing 2005, pp. 188-194.
Hirschberg et al: "Influence of Temperature and Pressure on Ashpaltene Flocculation"; Society of Petroleum Engineers Journal, Jun. 1984 pp. 283-293; SPE paper 11202.
Hirschberg, A: "Role of Asphaltenes in Compositional Grading of a Reservoir's Fluid Column"; Journal of Petroleum Technology, Jan. 1988 pp. 89-94, SPE 13171.
Hong et al: "Precipitation and fouling in heavy oil-diluent blends" Heat transfer engineering yr:2009 vol. 30 iss:10-11 p. 786-793.
Hwang et al: "Mitigation of asphaltics deposition during CO2 flood by enhancing CO2 solvency with chemical modifiers"; Organic Geochemistry 31 (2000) pp. 1451-1462.
Ibrahim et al: "Correlations of Characteristics of Saskatchewan Crude Oils/Asphaltenes with Their Asphaltenes Precipitation Behavior and Inhibition Mechanisms: Differences between CO2 and n-Heptane-Induced Asphaltene Precipitation"; Energy & Fuels 2004, 18, 1354-1369.
Jiang et al: ""Study of asphalt/asphaltene precipitation during addition of solvents to West Sak crude""; Preprints—American Chemical Society. Division of Petroleum Chemistry yr:1990 vol. 35 iss:3 p. 522-530.
Mansoori G A: "Modeling and Prevention of Asphaltene and Other Heavy Organic Deposition in Oil Wells"; SPE Paper 27070 (1994).
Medina Gonzalez et al: "Fatty Acid Methyl Esters as Biosolvents of Epoxy Resins: A Physicochemical Study"; J Solution Chem vol. 36 pp. 437-446 (2007).
Mitchell et al: "The solubility of asphaltenes in hydrocarbon solvents"; FUEL, 1973, vol. 52, April 149-152.
Mofidi et al: "A simplified thermodynamic modeling procedure for predicting asphaltene precipitation"; Fuel vol. 85 pp. 2616-2621 (2006).
Mutelet et al: "Solubility Parameters of Crude Oils and Asphaltenes"; Energy & Fuels 2004, 18, 667-673.
Nikookar et al: "Modification of a thermodynamic model and an equation of state for accurate calculation of asphaltene precipitation phase behavior"; Fuel 87 pp. 85-91 (2008).
Nilsson et al, "Solubilities of methyl oleate, oleic acid, oleyl glycerols and oleyl glycerol mixtures in supercritical carbon dioxide", 1991. J. Am. Oil. Chemists Soc., v68, No. 2, 87-91.
Raje et al: "Gel Systems for Controlling CO2 Mobility in Carbon Dioxide Miscible Flooding"; SPE paper 55965 (1999).
Redelius, P: "Bitumen Solubility Model Using Hansen Solubility Parameter"; Energy & Fuels 2004, 18. 1087-1092.
Redford, D.A., "The use of solvents and gases with steam in the recovery of bitumen from oil sands", JCPT, Jan.-Feb. 1982; Petsoc paper 82-01-03-P.
Shedid et al: "Laboratory Investigation of Influences of Initial Oil Saturation and Oil Viscosity on Oil Recovery by CO2 Miscible Flooding" SPE Paper 106958 (2007).
Speight, J Q: "The Chemistry and Technology of Petroleum" Third Edition, Revised and expanded, published Marcel Dekker 1999 pp. 412-419 and 452 & 453.
Takhar et al: "Prediction of Asphaltene Deposition During Production—Model description and Experimental Details"; SPE paper 30108 (1995).
Upreti et al: "Vapor Extraction of Heavy Oil and Bitumen: A Review"; Energy & Fuels 2007, 21, 1562-1574.
Verdier et al: "Experimental Determination of Solubility Parameters of Oils as a Function of Pressure"; Energy&Fuels vol. 19 pp. 1225-1229 (2005).
Verdier et al: "Study of Asphaltene Precipitation by Calorimetry"; Energy & Fuels 2007, 21. 3583-3587.

(56) References Cited

OTHER PUBLICATIONS

Verdier et al: "Study of Pressure and Temperature Effects on Asphaltene Stability in Presence of CO2"; Energy & Fuels 2006, 20, 1584-1590.

Wang, J et al: "Asphaltene Stability in Crude Oil and Aromatic Solvents—The Influence of Oil Composition"; Energy & Fuels 2003, 17, 1445-1451.

Wang, J X et al: "An Experimental Approach to Prediction of Asphaltene Flocculation"; SPE paper 64994 (2001).

Wiehe et al: "The Oil Compatibility Model and Crude Oil Incompatibility"; Energy & Fuels 2000, 14, pp. 56-59.

Yang et al: "Investigation of Subfractions of Athabasca Asphaltenes and Their Role in Emulsion Stability"; Energy & Fuels 2004, 18, 770-777.

\* cited by examiner

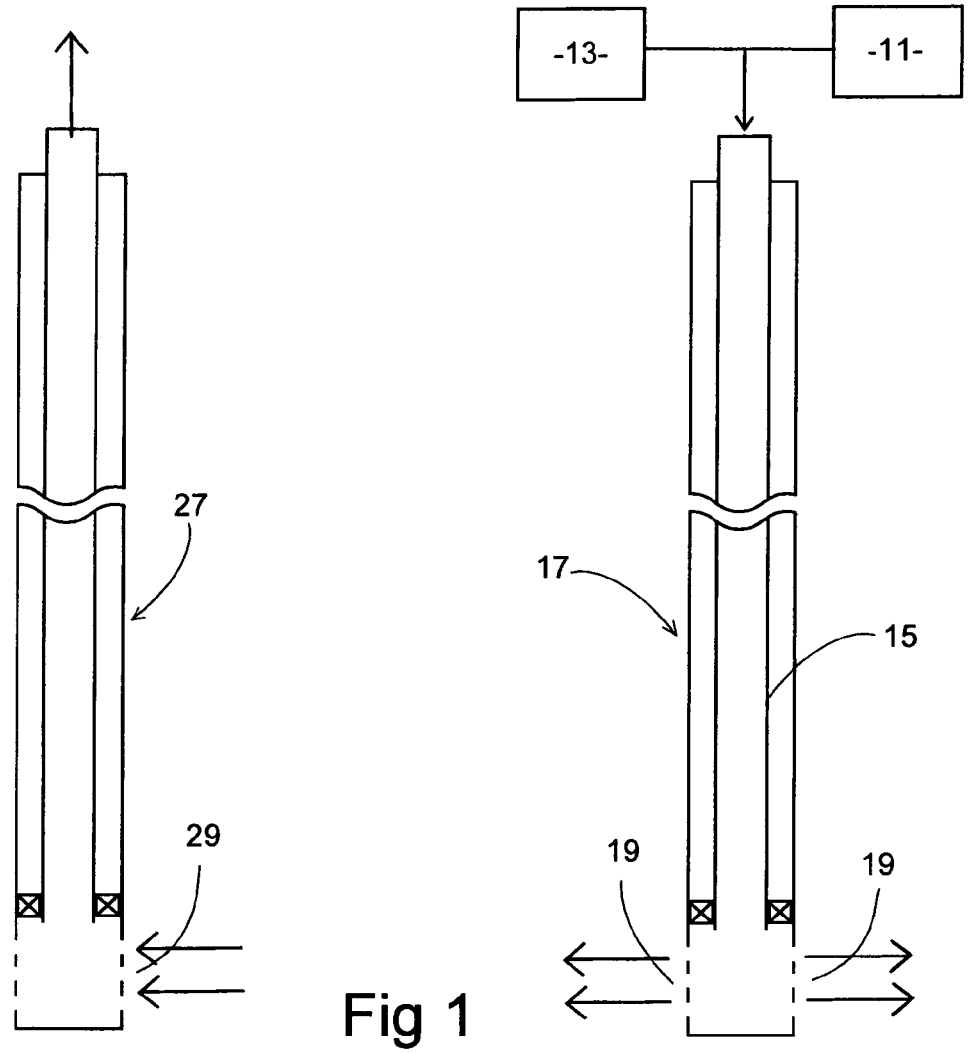
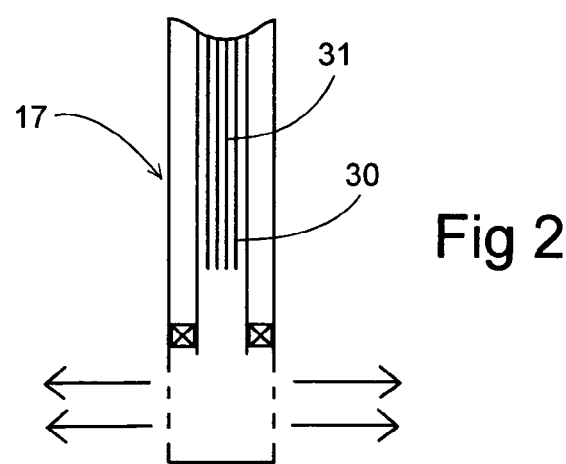

SOLVENT ASSISTED OIL RECOVERY

FIELD AND BACKGROUND OF THE INVENTION

The present invention relates to oil recovery techniques in which the recovery of oil from a reservoir is assisted by injecting a diluent into the reservoir formation to reduce the viscosity of the crude oil therein. Such techniques have been applied to the recovery of various oils, including the recovery of heavy oils and the enhanced recovery of medium and light oils. The diluent is intended to mix with the crude oil and form a mixture which has lower viscosity than that of the undiluted oil. One diluent which has frequently been proposed or used for this purpose is supercritical carbon dioxide. Another is low molecular weight liquid hydrocarbon which may be a distillation fraction such as naphtha. Mixtures of short chain alkanes, such as methane and ethane or propane and butane have also been used for this purpose, notably in the vapour extraction (VAPEX) process.

A factor which has sometimes been overlooked, but which can be relevant and even be a potential obstacle to such techniques is the possibility of asphaltene precipitation within the reservoir formation. Asphaltenes occur in varying, and sometimes quite substantial amounts in crude oils. They are a group of organic materials in which the molecules contain fused aromatic ring systems and include nitrogen, sulphur and/or oxygen heteroatoms. They are accordingly more polar than the other fractions of crude oil (saturates, aromatics and resins). They are believed, by some researchers, to occur as colloidal suspensions in crude oil and are prone to separate out if the oil is subjected to a reduction in temperature or pressure, as frequently happens during production from an oil well. Asphaltenes separate out if crude oil is mixed with a less polar diluent (notably a low-boiling n-alkane) and they are generally defined as the fraction of crude oil which is precipitated by addition of n-pentane or n-heptane but which is soluble in toluene.

The separation of asphaltene from crude oil has been variously referred to as flocculation, precipitation or deposition. A modern view is that nano-aggregates of asphaltene molecules flocculate to form a precipitate and this may deposit on adjacent surfaces. It is a well recognised issue that asphaltene may separate from crude oil and accumulate as an undesirable deposit within production, storage and transportation equipment. Remedial treatment of wellbores and near-wellbore regions with solvent and/or heat to remove deposited asphaltene is a regular commercial operation.

It has also been recognised that asphaltene can precipitate within a formation if a viscosity reducing diluent is injected into the formation and that this can cause significant formation damage. There have been proposals to include an asphaltene solvent in a viscosity-reducing diluent which is injected into a reservoir formation to assist oil recovery. Hwang and Ortiz in "Mitigation of asphaltics deposition during $CO_2$ flood by enhancing $CO_2$ solvency with chemical modifiers" Organic Geochemistry vol 31, pages 1451-1462 (2000), investigated the effect of adding various solvents to supercritical carbon dioxide used to enhance oil recovery. The amount of added solvent was arbitrarily set at 10% of the carbon dioxide and solvent mixture. They demonstrated that addition of various solvents and solvent mixtures to the carbon dioxide achieved a much greater extraction of oil and with a reduced total amount of carbon dioxide required to maximise recovery. They also showed that the carbon dioxide solvent mixtures reduced the amount of asphaltene remaining in the geological formulation compared with using carbon dioxide alone. The solvents which were tried were toluene, a light aromatic hydrocarbon mixture, alcohols, and mixtures of alcohol and toluene. The aromatic materials were found to be more effective than the alcohols.

US2007/295640 proposes treating a formation with a composition containing a viscosity reducing diluent (which was a substance that would be an asphaltene precipitant if used alone) together with an asphaltene solvent. Possible precipitating diluents include light hydrocarbons as well as carbon dioxide. The compounds suggested in this document as asphaltene solvents are aromatic and substituted aromatic compounds.

Some other documents can be identified, in retrospect, as utilising mixtures in which an aromatic asphaltene solvent was present. U.S. Pat. No. 4,004,636 taught a process of treating a tar sand formation with a multiple solvent system containing both a first component which is the liquefied form of a normally gaseous material such as carbon dioxide or a short chain hydrocarbon and a second component which is a normally liquid hydrocarbon. Suggested normally liquid hydrocarbons included some such as hexane which are asphaltene precipitants and some such as toluene which are asphaltene solvents. The former category, eg hexane, was preferred on economic grounds and it was reported, expressing some surprise, that these did not cause asphaltene precipitation. The intention was that the first component of the mixture would revert to its gaseous state within the reservoir formation and drive oil from the reservoir towards a production well, while the normally liquid hydrocarbon acted as solvent. Similar disclosure is found in U.S. Pat. No. 3,954,141 and U.S. Pat. No. 4,007,785, while U.S. Pat. No. 4,071,458 and U.S. Pat. No. 4,026,358 use an aromatic solvent saturated with carbon dioxide as the diluent. U.S. Pat. No. 5,139,088 taught a process in which an aromatic fraction of the extracted oil was recirculated into the reservoir formation to act as the diluent.

In summary, the materials which have been added successfully to a viscosity-reducing diluent to act as an asphaltene solvent have all been aromatic hydrocarbons. These originate from petroleum but are somewhat expensive products of the refining process.

U.S. Pat. No. 5,117,907 taught enhanced oil recovery using supercritical carbon dioxide to which trichloroethane was added in order to increase density and viscosity of the supercritical carbon dioxide. U.S. Pat. No. 4,800,957 taught the use of alcohols or ethylene glycol as additive to supercritical carbon dioxide for a similar purpose. These documents do not mention asphaltene and do not suggest that there was any asphaltene precipitation even in the absence of the additive.

SUMMARY OF THE INVENTION

We have found that a process for the recovery of crude oil which includes the injection of a viscosity reducing diluent into a reservoir to assist production from the reservoir can be improved by the use of certain aliphatic compounds. These compounds can reduce the amount of asphaltic precipitation from the crude oil and provide an alternative to use of an aromatic substance. So, in one aspect of this invention there is provided a method of recovering oil from a reservoir, comprising injecting viscosity reducing diluents into the reservoir to assist oil recovery, wherein the diluents include an asphaltene precipitant and a more polar substance which reduces asphaltene precipitation, characterized in that said substance comprises at least one aliphatic compound which includes at least one of:

a cycloaliphatic ring,
an olefinic unsaturation,
an ester group or an ether group.

The presence of a cyclic ring, or unsaturation or ester or ether functionality in an aliphatic compound makes the compounds somewhat more polar than the asphaltene precipitants such as short, straight chain paraffins.

These compounds are not as polar as the aromatic solvents which have been proposed in the literature to reduce asphaltene precipitation. However, we have found that they are nevertheless effective to reduce asphaltene precipitation to a low level and in consequence these aliphatic compounds can provide a good alternative to aromatic solvents.

Preferably these compounds have from 4 to 70 carbon atoms. We may prefer that they contain only carbon, hydrogen and oxygen atoms. If any oxygen atoms are present, we may prefer that these are present only in ester or ether groups. It is preferred that the number of carbon atoms is at least 6 or 8. The number may well not exceed 60. It is preferred that hydroxyl groups are absent and ketone or aldehyde groups may well also be absent. Included amongst these compounds are some which are available as natural products or as derivatives of natural products and which can provide an economical alternative to petroleum derived aromatic compounds. It is envisaged that such an aliphatic compound will not include any aromatic ring.

Possible asphaltene precipitants, i.e. viscosity reducing diluents which cause the precipitation of asphaltene if used alone, include linear alkanes, normally liquid mixtures of non-cyclic aliphatic hydrocarbons such as naphtha, and normally gaseous hydrocarbons in liquefied form such as liquefied methane, ethane, propane, butane or any mixture of these. The terms "normally liquid" and "normally gaseous" signify the state at ambient conditions such as 20° C. and 1 bar pressure. Such hydrocarbons may be a product of oil-refining, notably a product of refining the crude oil which is being produced. Alternatively the asphaltene precipitant may be a supercritical fluid such as supercritical carbon dioxide or it may be a mixture of carbon dioxide and light hydrocarbon(s). When one or more aliphatic compounds in accordance with this invention are mixed with supercritical carbon dioxide, the ratio of extracted oil to carbon dioxide is (advantageously) increased as has been reported in the literature with other compounds.

Because the aliphatic substance called for by this invention is more polar than the asphaltene precipitant, it causes less precipitation, or none. It is preferably a substance which does not induce precipitation from the crude oil contained in the reservoir, regardless of how much of it is mixed with the oil. It may be an outright asphaltene solvent, capable of redissolving precipitated asphaltene. It may be a single compound or a mixture of compounds.

A viscosity reducing diluent mixture may contain other materials in addition to the asphaltene precipitant and the more polar aliphatic compound or mixture of compounds. Possibilities include surfactants, viscosity enhancing agents, foam generating agents and/or foam control agents. It is possible, although not preferred, that the aliphatic compounds called for by this invention could be used in a mixture with aromatic compounds. In this event, the aliphatic compounds of this invention may be at least 30% by volume of the mixture and preferably a higher percentage such as at least 50% or 60%.

It is desirable for the aliphatic compounds called for by this invention to partition preferentially into oil rather than into an aqueous phase. A material which partitions into an aqueous phase would be at risk of being lost on encountering brine in the reservoir formation. Preferential partitioning into oil can be signified by an oil/water partition coefficient which is greater than one and preferably greater than 10.

The polarity of the aliphatic compounds which are used in accordance with this invention can be put on a quantitative basis by use of Hildebrand solubility parameter, and specified more closely by use of Hildebrand and Hansen solubility parameters.

As mentioned above, the presence of a cyclic ring, or unsaturation or ester or ether functionality makes the aliphatic compounds called for by this invention more polar than the asphaltene precipitants which have been used as viscosity reducing diluents and may provide polarity within ranges of Hildebrand and Hansen solubility parameter which we have found to be desirable.

The Hildebrand solubility parameter (usually designated $\delta$) of a material is defined as the square root of its cohesive energy density, which is equal to its heat of vaporisation divided by molar volume. It is expressed in units of $MPa^{1/2}$ or in units of $(cal/cc^3)^{1/2} = cal^{1/2} cm^{-3/2}$.

The solubility parameter of a mixture can readily be calculated from individual values and volume fractions by applying the general formula $$\delta_{diluent} = \Sigma \phi_i \delta_i$$

where $\phi_i$ and $\delta_i$ respectively denote the volume fraction and solubility parameter of an individual constitutent.

Hansen solubility parameters are a set of three parameters with the same units as the Hildebrand parameter but which denote separately a dispersion component ($\delta_d$), a polar component ($\delta_p$) and a hydrogen bonding component ($\delta_h$). These are related to the Hildebrand parameter $\delta$ by the formula $$\delta^2 = \delta_d^2 + \delta_p^2 + \delta_h^2$$

Both Hildebrand and Hansen solubility parameters have been published for many chemical compounds, for example in "The CRC Handbook of Solubility Parameters and Other Cohesion Parameters" by A F M Barton and "Hansen solubility parameters: a user's handbook" by C H Hansen.

We prefer that the aliphatic compounds or mixtures of aliphatic compounds used to reduce asphaltene precipitation in accordance with this invention should have Hildebrand and Hansen solubility parameters in the ranges:

Hildebrand $\delta$ 16.0-21.0 $MPa^{1/2}$, preferably at least 16.4, better at least 17.0 and usually not over 20.5 $MPa^{1/2}$.

Hansen $\delta_d$ 14.5-19.6 $MPa^{1/2}$ $\delta_p$ 0-8.2 $MPa^{1/2}$ and $\delta_h$ 0-6.8 $MPa^{1/2}$ The upper limits for these ranges exclude materials which are very polar and/or include hydroxyl groups and consequently are poor asphaltene solvents, typically having low solubility in oil and low oil/water partition coefficients. Methanol, for instance has Hansen solubility parameters of $\delta d=15.1$ $\delta p=12.3$ and $\delta h=22.3$ so that two of the three Hansen parameters fall outside the above ranges.

The aliphatic compounds called for by this invention include two preferred sub-groups of compounds. The first preferred sub-group is hydrocarbons having from 8 to 20 carbon atoms, preferably from 10 to 15 and more especially 10 carbon atoms, including at least one cycloaliphatic ring and/or including at least one olefinic unsaturation. This category includes some naturally occurring terpenes, notably pinenes and limonene. Limonene, which is a C10 terpene; is a natural product available commercially in substantial quantities. These hydrocarbons may well have Hildebrand solubility parameter at the low end of the preferred range, such as from 16.0 to 16.4 MPa1/2. Depending on the properties of the oil, they may function to reduce asphaltene precipitation without being able to meet the criterion of never inducing precipitation from crude oil if used alone at any concentration. An advantage of hydrocarbons, such as these, as an asphaltene solvent is that they could be recovered from the produced oil by distillation during the refining process. Although it would not be economic to isolate them completely from constituents of the oil, they could be concentrated in a refinery fraction which was returned to the oilfield and included in a viscosity-reducing diluent mixture.

The second preferred sub-group of aliphatic materials are aliphatic esters incorporating alkyl or alkenyl groups of 6, preferably 10, up to 22 carbon atoms.

This esters category can itself be divided into three parts. The first is esters of formula

wherein R1 and R2 are straight or branched aliphatic hydrocarbon chains optionally including olefinic unsaturation and having a length of 1 to 22 carbon atoms and where R1 and R2 together contain 12 to 44 carbon atoms.

One possibility within this formula is esters of long chain alcohols, so that R1 is methyl ethyl, propyl or butyl and R2 has 10 to 22 carbon atoms. Another possibility is esters where both R1 and R2 contain at least five carbon atoms, possibly from 5 or 6 to 10 carbon atoms. A third and more readily available possibility is alkyl esters of long chain fatty acids in which R1 contains 11 to 22 carbon atoms and R2 is methyl ethyl, propyl or butyl. These can be obtained by transesterification of natural oils and fats. Such esters may be esters of saturated acids, for instance methyl stearate, or esters of unsaturated acids, for instance methyl oleate.

A second part of the esters category is diesters of formula

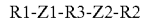

where Z1 and Z2 are each COO or OCO, R1, R2 and R3 are straight or branched aliphatic hydrocarbon chains optionally including olefinic unsaturation and each having a length of 1 to 22 carbon atoms, and R1, R2 and R3 together contain from 12 to 66 carbon atoms.

A third part of the esters category is triglycerides of formula

where $R_1$, $R_2$ and $R_4$ are straight or branched aliphatic hydrocarbon chains optionally including olefinic unsaturation and each having a length of 1 to 22 carbon atoms, and $R_1$, $R_2$ and $R_4$ together contain from 12 to 66 carbon atoms. Triglycerides of acids with 12 or more carbon atoms have similar solubility parameters and it may be both convenient and economical to use a mixture of triglycerides provided by one or more natural oils, in which case $R_1$, $R_2$ and $R_4$ preferably each have from 11 to 17 carbon atoms. More particularly, palm oil may be used.

Solubility parameters of some examples of preferred materials are set out in the following table:

| Compounds | Hansen parameters | | | Hildebrand |
| --- | --- | --- | --- | --- |
| | $\delta_d$ (MPa$^{1/2}$) | $\delta_p$ (MPa$^{1/2}$) | $\delta_h$ (MPa$^{1/2}$) | $\delta$ (MPa$^{1/2}$) |
| d-limonene | 16.4 | 0.2 | 0.2 | 16.4 |
| α-pinene (racemic) | 15.5 | 4.3 | 0 | 16.1 |
| methyl ester of soybean oil | 16.2 | 4.9 | 5.9 | 17.9 |
| cyclohexane | 16.8 | 0 | 0.2 | 16.8 |
| glyceryl tripalmitate | 18.0 | 4.3 | 4.3 | 19.0 |

An important feature, whose significance has not previously been recognized, is that these aliphatic materials have good solubility in supercritical carbon dioxide. Notably, limonene has a solubility in supercritical carbon dioxide which increases very rapidly with increasing pressure, reaching as high as 50% by weight above 100 bar at 45° C. (as reported by Berna et al, J. Chem. Eng. Data 2000 Vol 45 pp 724-7). One possibility here is to use a mixture of materials from both the hydrocarbons and esters subgroups to provide an asphaltene solvent. An example of such a mixture would be limonene and methyl soybean oil. Another would be a mixture of limonene and palm oil. Such mixtures would be more polar than limonene alone, and would also have good solubility in supercritical carbon dioxide.

BRIEF DESCRIPTION OF THE DRAWINGS

FIG. 1 shows a first arrangement with a production well and an injection well;

FIG. 2 is a detail showing a variation on FIG. 1;

DETAILED DESCRIPTION

Figure 3:
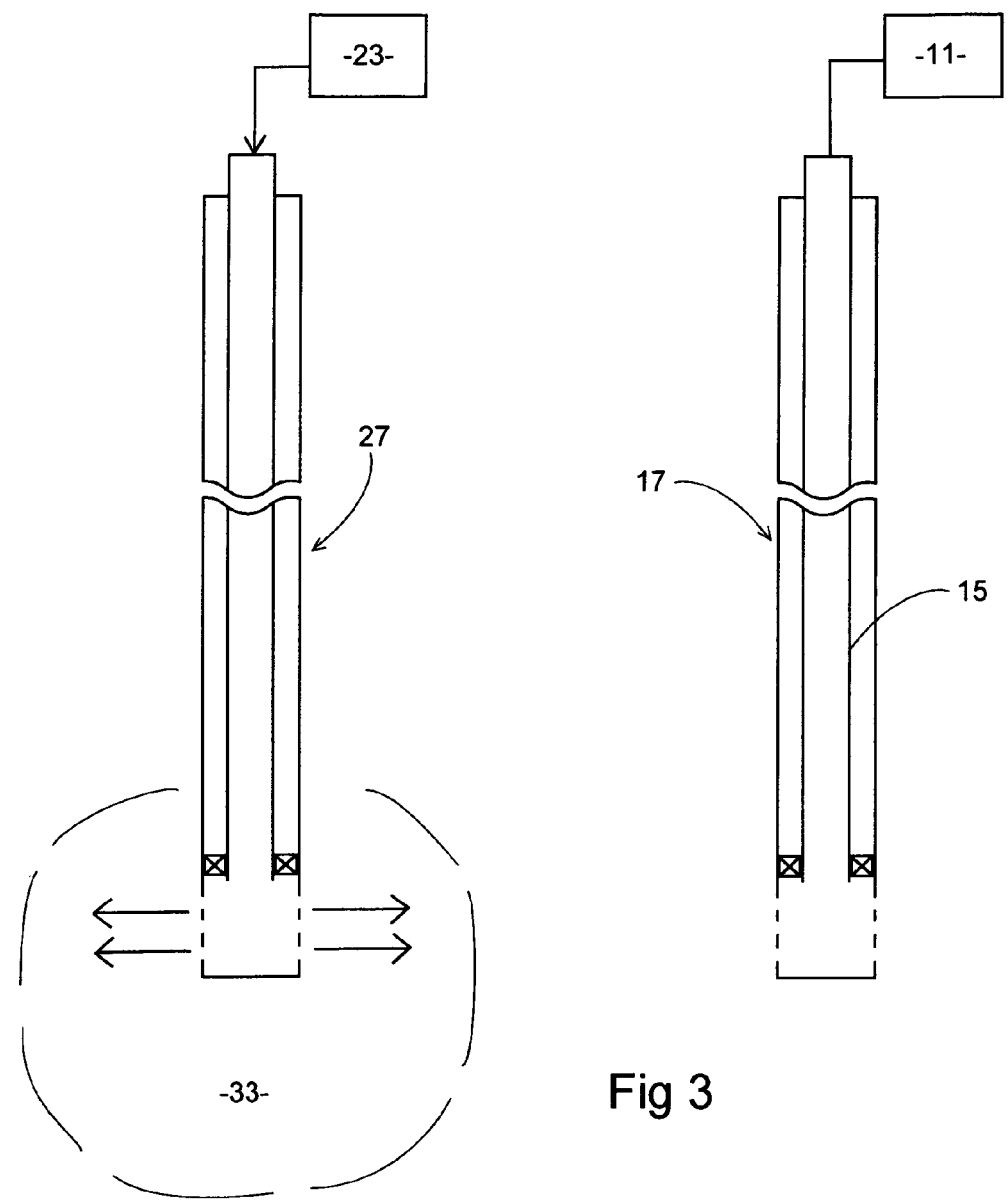
FIG. 3 shows a second arrangement, also with a production well and an injection well.

This invention's combination of an asphaltene precipitant and a more polar aliphatic material may be used in various ways. One possibility, as schematically illustrated in FIG. 1, is that both the asphaltene precipitant from a supply 11 and the more polar material from a supply 13 are mixed at the surface and pumped down within the casing 15 of an injection well 17 from which they are pumped out at 19 into a reservoir formation while at 29 a mixture of oil and diluent flows into a production well 27 at some distance from the injection well 17. In this example both wells are vertical, but the invention may be applied to wells at other orientations. A production well may have several such injection wells positioned around it, conforming to normal practice.

It is desirable that the mixture of asphaltene precipitant and more polar material forms a single phase within the reservoir formation around the injection well. If the asphaltene precipitant from the supply 11 is an alkane or a mixture of alkanes in a liquid state, a single phase should readily form on mixing at the surface.

However, if the asphaltene precipitant is carbon dioxide, the more polar material will be more soluble in supercritical carbon dioxide than in compressed gaseous carbon dioxide. Consequently, it may be desirable to pump the carbon dioxide and the more polar additive down separate flow paths within the injection well, until the carbon dioxide reaches a supercritical state and then mix the materials. FIG. 2 shows the use of a pipeline 30 enclosing a smaller pipeline 31. The asphaltene precipitant is pumped down the annulus between the inner pipeline 3 and the pipeline 30 while the more polar material is pumped down the inner pipeline 31 until they reach the foot of the injection well 17.

Another possibility for delivery of the materials would be to place a supply vessel containing the more polar material downhole during completion of the well and operate an outlet valve to dispense this material into a flow of the carbon dioxide or other asphaltene precipitant as this is being pumped from the surface.

FIG. 3 shows a different scheme. The more polar material is being used to prevent asphaltene precipitation in the near-wellbore region around the foot of the production well 27. To do this, the production well 27 is temporarily taken out of production and the polar material is pumped down it, from supply 23. A bank 33 of this material is built up in the near-wellbore region. Once this is in place, the asphaltene precipitating diluent material is pumped from the supply 11 down the injection well 17 and into the reservoir. It dilutes the oil in the reservoir where it causes asphaltene precipitation. The reservoir is sufficiently porous to tolerate this (although not all reservoirs would be sufficiently porous). However, when diluted oil flows into the bank 33 of the more polar material around the production well, it mixes with this material and asphaltene precipitation in this near-wellbore region is reduced or prevented.

Figure 4A:
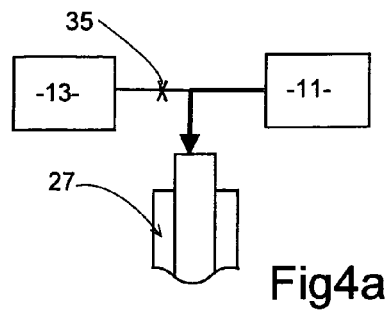
FIGS. 4a to 4c show successive stage of an arrangement with cyclic injection and production with a single wellbore.
Figure 4B:
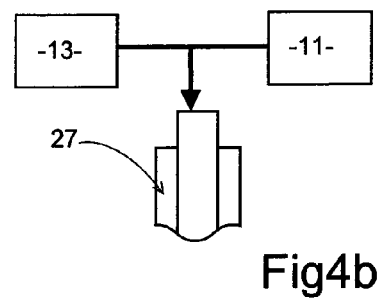
Figure 4C:
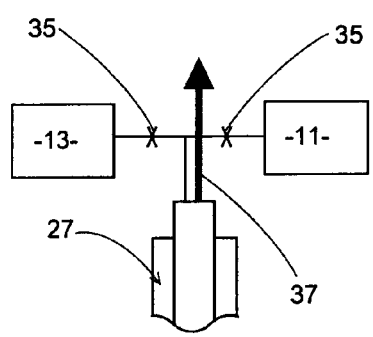

FIGS. 4a to 4c show a further approach. A production well 27 is being operated with a cyclic procedure in which injection of viscosity reducing diluents alternates with production of oil. During the injection stage of the cycle, shown in FIG. 4a, production is halted and a diluent, which is an asphaltene precipitant, is taken from a supply 11 and pumped down the wellbore and into the reservoir formation. A supply 13 of a more polar material is connected to the wellbore, but remains shut off by a valve, as diagrammatically represented at 35.

Towards the end of this injection stage, the supply 13 is opened as indicated in FIG. 4b and the more polar material from the supply 13 is mixed with the precipitant from supply 11. This mixture is pumped down the wellbore and into the near-wellbore region of the reservoir to remove precipitated asphaltene from this region.

Next both supplies 11 and 13 are closed off as indicated at 35 in FIG. 4c. Production is resumed as indicated by the bold arrow 37. The produced oil is diluted with the asphaltene precipitant pumped in during the stage shown at FIG. 4a while asphaltene precipitated from it remains in the reservoir, but not in the near-wellbore region from which it was removed by the pumping of more polar material as illustrated by FIG. 4b.

Experimental Work

A series of experiments were carried out to show that asphaltene precipitation can be inhibited with aliphatic materials in accordance with this invention. This work was carried out using a sample of a heavy crude oil with API gravity of approximately 9.4.

The oil was initially dewatered by rotary evaporation at 60° C. under vacuum (15 mbar pressure) for two hours with brief interruptions every 15 minutes to vent the apparatus and then reapply vacuum. Five samples of varying size were dewatered in the same way and the percentage weight loss was observed to be accurately repeatable indicating that all water had been removed by evaporation.

A number of experiments were carried out in which 1 gm sub-samples of this dewatered oil were equilibrated with approximately 40 ml of diluent for 48 hours in the dark at ambient laboratory temperature and pressure (25° C. and Thar). The precipitated solids were separated by filtration (0.45 micron polytetrafluoroethylene filter paper). The separated precipitate and the filter paper were thoroughly washed with additional quantities of the diluent to make sure that no traces of the filtrate remained. The precipitate was then dried and weighed.

The diluents were heptane, limonene and mixtures of the two, in some cases with a small quantity of toluene added. The Hildebrand solubility parameters of these solvents are

| | |
|---|---|
| Heptane | 15.25 MPa$^{1/2}$ |
| Limonene | 16.4 MPa$^{1/2}$ |
| Toluene | 18.2 MPa$^{1/2}$ |

The Hildebrand solubility parameter $\delta_{diluent}$ of each diluent mixture was calculated using the above values. The Hildebrand solubility parameter for the overall mixture of diluents and oil $\delta_{oil+diluent}$ was also calculated, taking the solubility parameter of the oil which had been found to be 18.6 MPa$^{1/2}$. Because the proportion of oil was small, the values of $\delta_{oil+diluents}$ were close to the values of $\delta_{diluent}$. The compositions of the mixtures, the calculated values of solubility parameter and the weights of residue on the filter paper are set out in the following table:

| Test | Volume oil (ml) | Volume toluene (ml) | Volume heptane (ml) | Volume limonene (ml) | Solubility Parameter $\delta_{diluent}$ | Solubility Parameter $\delta_{oil+diluent}$ | Residue (wt % of oil) |
|---|---|---|---|---|---|---|---|
| 1 | 1.03 | 2.28 | 40.2 | none | 15.41 | 15.48 | 14.9 |
| 2 | 1.04 | 3.41 | 40.3 | none | 15.48 | 15.55 | 12.2 |
| 3 | 1.07 | none | 20.6 | 22.5 | 15.85 | 15.92 | 6.7 |
| 4 | 1.07 | none | 5.9 | 35.6 | 16.24 | 16.30 | 0.4 |
| 5 | 1.21 | 1.96 | none | 39.9 | 16.48 | 16.54 | 0.03 |
| 6 | 1.06 | 3.48 | none | 39.9 | 16.54 | 16.59 | 0.18 |

As can be seen from test 3 in this table, use of limonene in a mixture with heptane reduced the amount of asphaltene precipitation considerably. In test 4 limonene was mixed with only a small quantity of heptane and the amount of precipitated asphaltene was very small.

Tests 5 and 6, in which the diluent was principally limonene, gave no precipitate of asphaltene. This observation was confirmed by visual inspection of the washed filter papers. Black asphaltene could be seen on the filter paper for mixture 4, even though the weight of precipitated asphaltene collected was small whereas the filter paper for test 6 was merely discoloured to pale brown (assumed to be inorganic material).

Figure 5:
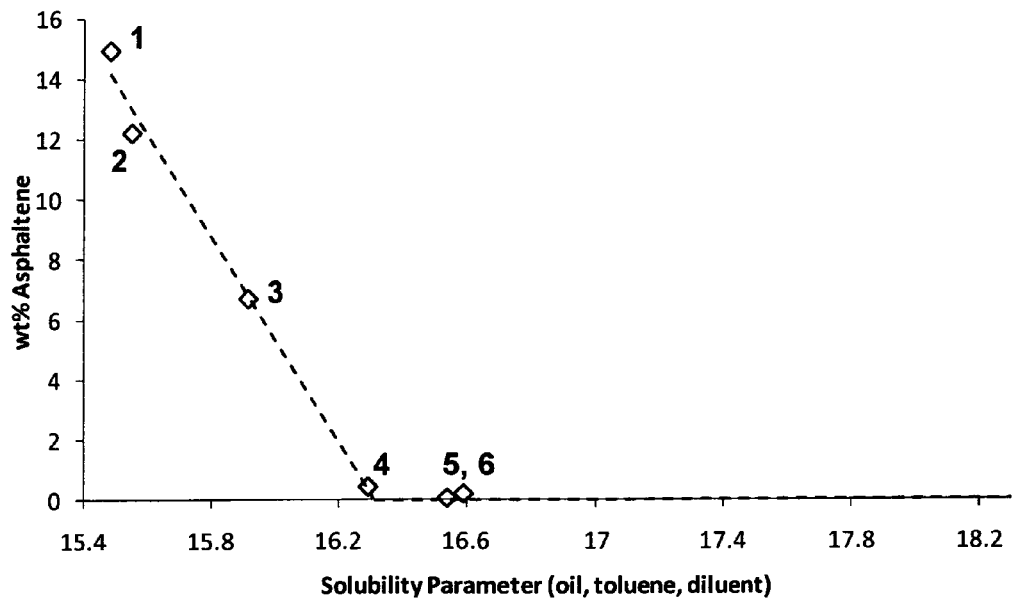
FIG. 5 is a graph showing results from experiments in which oil is mixed with a diluent and the amount of precipitated asphaltene is plotted against Hildebrand solubility parameter of the oil-plus-diluent mixture.

The amounts of asphaltene precipitated, as a weight percentage of the oil, were plotted against the solubility parameter $\delta_{oil+diluent}$ of the oil+diluent mixture. The resulting graph is shown as FIG. 5.

Figure 6:
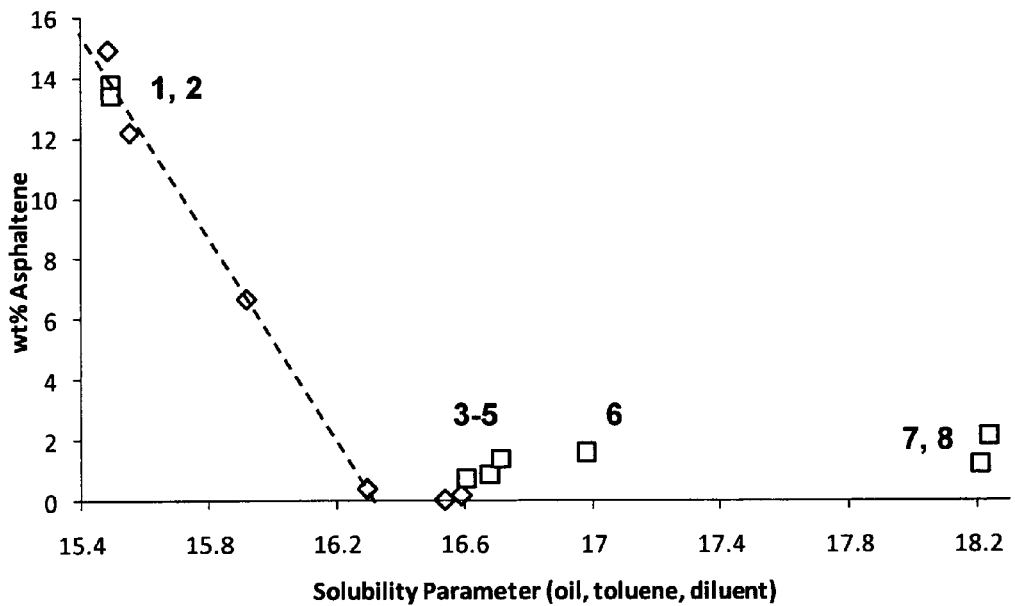
FIG. 6 is the graph of FIG. 5 including additional results obtained by a different experimental technique.

In a related series of experiments, mixtures of oil and diluent were allowed to equilibrate in a test cell equipped for filtration by application of pressure to drive the cell contents through a filter paper supported on a metal mesh at the base of the test cell. Each mixture was allowed to equilibrate for four hours at 43.5° C. under an applied nitrogen pressure of 100 psi (6.91 bar) and then filtered through a 0.45 micron polytetrafluoroethylene filter paper by venting the pressure below the filter paper. The mixtures and calculated values of solubility parameter are set out in the following table. FIG. 6 shows these results (represented as square points) superimposed on the graph of FIG. 5.

| Test | Volume oil (ml) | Volume toluene (ml) | Volume heptane (ml) | Volume limonene (ml) | Solubility Parameter $\delta_{diluent}$ | Solubility Parameter $\delta_{oil+diluent}$ | Residue (wt % of oil) |
|---|---|---|---|---|---|---|---|
| 1 | 1.00 | 2.55 | 40.4 | none | 15.43 | 15.50 | 13.8 |
| 2 | 1.08 | 2.51 | 40.6 | none | 15.42 | 15.50 | 13.4 |
| 3 | 1.03 | 3.91 | none | 38.9 | 16.56 | 16.61 | 0.76 |
| 4 | 1.01 | 2.47 | none | 20.3 | 16.60 | 16.68 | 0.91 |
| 5 | 1.02 | 2.69 | none | 18.7 | 16.63 | 16.72 | 1.40 |
| 6 | 1.24 | 2.47 | none | 8.7 | 16.80 | 16.98 | 1.62 |
| 7 | 1.06 | 36.19 | none | none | 18.20 | 18.21 | 1.23 |
| 8 | 1.05 | 10.03 | none | none | 18.20 | 18.24 | 2.15 |

It can be seen from this graph that limonene, with a solubility parameter of 16.4 $MPa^{1/2}$ is as effective an asphaltene solvent as toluene even though toluene has a higher solubility parameter of 18.2 $MPa^{1/2}$.

(With both limonene and toluene, it was observed that small amounts of residue were collected on the filter paper and that the amounts increased slightly as the volume of diluent was reduced. This was because the collected residue was not washed, so that some viscous oil was retained on the filter paper).

It can be seen from these graphs that precipitation falls to zero at a value of solubility parameter of the mixture, termed the onset point in some literature, which is a property of the oil. We have found that this point tends to be below the solubility parameter of aromatic materials, allowing aliphatic materials of lower solubility parameter to be effective.

Figure 7:
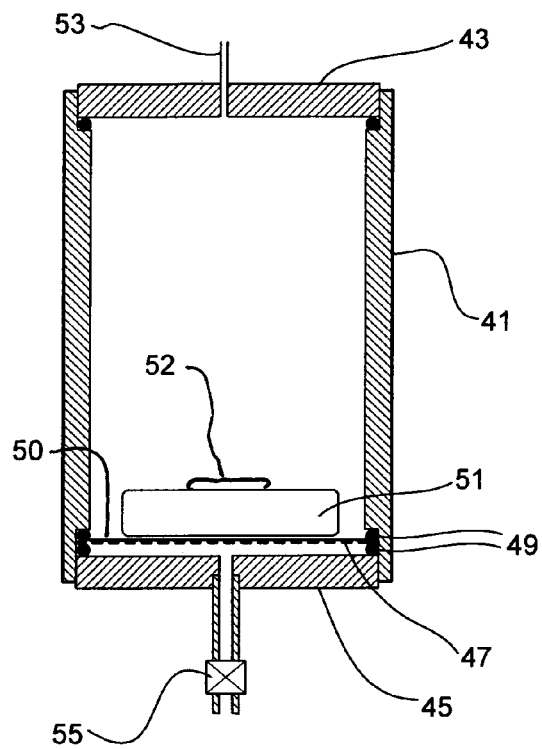
FIG. 7 is a cross-section of a test cell used in further experiments.

Comparative experiments were carried out to demonstrate the effect of limonene as a solvent to counter asphaltene precipitation. The experiment is a model for pumping an aliphatic compound according to this invention into the near-wellbore region of a well when carbon dioxide is used as a drive fluid. The apparatus for these experiments is shown in FIG. 7.

The test cell itself has a cylindrical tubular body 41 with a diameter of 5 cm; closed by a top end fitting 43 with a gas inlet 53 and a bottom end fitting 45 with an outlet through a needle valve 55. A metal mesh 47 is held at its rim between two O-rings 49 and thus supported slightly above bottom end fitting 45. A filter paper 50 is placed on the mesh 47. As so far described this cell is the same as that used for the experiments whose results are shown in FIG. 6.

However, for these comparative experiments a 0.7 gm quantity of oil 52 was placed at the centre of a preweighed disc 51 of Berea sandstone with a diameter of 3.75 cm and thickness 0.5 cm. This was then placed on the filter paper 50 as shown. Carbon dioxide was admitted to the cell through the top inlet, and pressurized to 1300 psi (89.6 bar). The volume of the cell was such that under these conditions it held roughly 90 gm of carbon dioxide. The cell was allowed to equilibrate at 43.5 C for two hours. Under these conditions of temperature and pressure the carbon dioxide was a supercritical fluid. At the end of this time the cell was depressurised to 100 psi (6.89 bar) by venting carbon dioxide through the top. The needle valve 55 was then opened so that the remaining pressure was expelled through the 0.45 micron polytetrafluoroethylene filter paper. After this filtration step, the disc 51 was removed from the cell and immersed in 40 mL heptane for 24 hours to induce asphaltene precipitation from the oil remaining on the sandstone disc 51.

The second experiment in the comparison was similar except that after the disc 51 with applied oil 52 had been placed in the cell, just enough limonene (10.9 ml) was added to immerse the oil/rock sample. The cell was then pressurized with carbon dioxide and the procedure carried out as before.

In the first experiment ($CO_2$ only), the viscosity of the oil was reduced by the carbon dioxide, so that it spread out on the surface of disc 51 and a very small proportion of it ran over the edge of the disc onto the filter paper. No filtrate was produced. The weight of oil remaining on the disc and the weight flowed onto the filter paper were substantially equal to the initial weight of oil initially loaded onto the sandstone disc. When the disc was removed from the cell and placed in heptane a quantity of precipitated asphaltene was observed on the surface of the disc: it had the appearance of an uneven layer of black powder on the disc.

In the second experiment, with limonene present, the amount of carbon dioxide in the cell was determined (from the volume of the cell and the density of carbon dioxide at the temperature and pressure within the cell) to be 88.46 gm. The weight of limonene was 9.22 gm and this quantity of limonene would be soluble in the quantity of carbon dioxide in the cell under the conditions therein.

When the cell was depressurized to 100 psi (6.9 bar) a small quantity (less than 1 ml) of limonene and oil condensed out of the carbon dioxide removed during depressurisation but most of the limonene and oil was produced as filtrate during the filtration step. The amount of filtrate collected was 7.53 gm. Assuming the oil and limonene to be mixed in the original proportions put into the cell, this would contain 0.560 gm oil. Thus over 75% of the oil had been mobilized sufficiently to be produced as filtrate. A further 0.0441 gm oil was collected on the filter paper. When the disc was removed from the cell and placed in heptane, the disc was observed to be stained to a dark colour, but no solid precipitate could be observed. It was apparent that under these conditions the limonene in the carbon dioxide had made the oil into a mobile solution phase without precipitating asphaltene from it.

The invention claimed is:

1. A method of recovering oil from a reservoir, comprising injecting a viscosity reducing diluent into the reservoir via an injection well to assist oil recovery via a production well spaced from the injection well, wherein the diluent comprises an asphaltene precipitant which comprises carbon dioxide which is in supercritical state when injected into the reservoir and wherein the method also comprises injecting into the reservoir a further viscosity reducing diluent substance which is more polar than the asphaltene precipitant and which reduces asphaltene precipitation, wherein-said further viscosity reducing diluent substance comprises at least one aliphatic compound which consists of carbon, hydrogen and oxygen atoms only, contains from 4 to 70 carbon atoms and includes at least one of the following:

a cycloaliphatic ring;
an olefinic unsaturation; and
an ester or ether group;
with any oxygen atom being present within a said ester or ether group.

2. A method according to claim 1 wherein the said further viscosity reducing diluent substance has a Hildebrand solubility parameter in the range from 16 to 21 $MPa^{1/2}$.

3. A method according to claim 1 wherein the said further viscosity reducing diluent substance has Hansen solubility parameters in the ranges:
$\delta_d$ 14.5-19.6 $MPa^{1/2}$
$\delta_p$ 0-8.2 $MPa^{1/2}$
$\delta_h$ 0-6.8 $MPa^{1/2}$.

4. A method according to claim 1 wherein the said further viscosity reducing diluent substance comprises at least one hydrocarbon containing 5 to 20 carbon atoms and having at least one cycloaliphatic ring and/or at least one olefinic unsaturation.

5. A method according to claim 1 wherein the said further viscosity reducing diluent substance comprises at least one aliphatic ester containing at least one a saturated or unsaturated aliphatic chain of 6 to 22 carbon atoms.

6. A method according to claim 5 wherein the said further viscosity reducing diluent substance comprises at least one ester of the general formula $$R_1\text{—COO—}R_2$$

where $R_1$ and $R_2$ are straight or branched aliphatic hydrocarbon chains optionally including olefinic unsaturation and having a length of 1 to 22 carbon atoms and where $R_1$ and $R_2$ together contain 12 to 44 carbon atoms.

7. A method according to claim 6 wherein $R_1$ comprises a straight or branched aliphatic hydrocarbon chain optionally including olefinic unsaturation and having a length of 11 to 18 carbon atoms and where $R_2$ comprises methyl, ethyl, propyl and/or butyl.

8. A method according to claim 5 wherein the said further viscosity reducing diluent substance comprises diesters of formula $$R_1\text{—}Z_1\text{—}R_3\text{—}Z_2\text{—}R_2$$

where $Z_1$ and $Z_2$ each represent COO or OCO, $R_1$, $R_2$ and $R_3$ are straight or branched aliphatic hydrocarbon chains optionally including olefinic unsaturation and each having a length of 1 to 22 carbon atoms, and $R_1$, $R_2$ and $R_3$ together contain from 12 to 66 carbon atoms.

9. A method according to claim 5 wherein the said further viscosity reducing diluent substance comprises triglycerides of formula $$R_1COO\text{—}CH2\text{—}CH(OCOR_4)\text{—}CH2\text{—}OCOR_2$$

where $R_1$, $R_2$ and $R_4$ are straight or branched aliphatic hydrocarbon chains optionally including olefinic unsaturation and each having a length of 1 to 22 carbon atoms, and $R_1$, $R_2$ and $R_4$ together contain from 12 to 66 carbon atoms.

10. A method according to claim 9 wherein $R_1$, $R_2$ and $R_4$ each contain from 11 to 21 carbon atoms.

11. A method according to claim 1 wherein the said further viscosity reducing diluent substance comprises a mixture of
at least one hydrocarbon containing 5 to 20 carbon atoms and having at least one cycloaliphatic ring and/or at least one olefinic unsaturation and
at least one aliphatic ester containing at least one a saturated or unsaturated aliphatic chain of 6 to 22 carbon atoms.

12. A method according to claim 1 wherein both the carbon dioxide and the more polar further viscosity reducing diluent substance are injected into the reservoir via the same injection wellbore, with the carbon dioxide in a supercritical state and the further viscosity reducing diluent substance in solution in the supercritical carbon dioxide.

13. A method according to claim 1 wherein the said more polar further viscosity reducing diluent substance which reduces asphaltene precipitation is injected via a production wellbore into the region of the reservoir adjacent to that wellbore.

14. A method according to claim 1 wherein the asphaltene precipitant comprises hydrocarbon mixed with carbon dioxide which is in supercritical state when injected into the reservoir.

15. A method according to claim 2 wherein the further viscosity reducing diluent substance has a Hildebrand solubility parameter less than 18.2 $MPa^{1/2}$.

* * * * *